United States Patent
Majumdar (10) Patent No.: US 9,631,520 B2
(45) Date of Patent: Apr. 25, 2017

(54) TURBINE SYSTEM

(75) Inventor: Pramurtta Shourjya Majumdar, Strathclyde (GB)

(73) Assignee: DOOSAN BABCOCK LIMITED, Sussex (GB)

( * ) Notice: Subject to any disclaimer, the term of this patent is extended or adjusted under 35 U.S.C. 154(b) by 707 days.

(21) Appl. No.: 14/112,003

(22) PCT Filed: Apr. 13, 2012

(86) PCT No.: PCT/GB2012/050821
§ 371 (c)(1),
(2), (4) Date: Feb. 6, 2014

(87) PCT Pub. No.: WO2012/140440
PCT Pub. Date: Oct. 18, 2012

(65) Prior Publication Data
US 2014/0283518 A1 Sep. 25, 2014

(30) Foreign Application Priority Data

Apr. 15, 2011 (GB) .................................. 1106410.2

(51) Int. Cl.
*F01K 7/22* (2006.01)
*F01K 7/06* (2006.01)
(Continued)

(52) U.S. Cl.
CPC .................. *F01K 7/22* (2013.01); *F01K 7/06* (2013.01); *F01K 7/16* (2013.01); *F01K 17/04* (2013.01); *F01K 19/00* (2013.01); *Y02E 20/326* (2013.01)

(58) Field of Classification Search
CPC .................... F01K 7/22; F01K 19/00
See application file for complete search history.

(56) References Cited

U.S. PATENT DOCUMENTS 4,042,809 A * 8/1977 Shetler .................... F01K 7/345
  60/648
4,149,386 A * 4/1979 Luongo .................. F01D 19/02
  60/663

(Continued)

FOREIGN PATENT DOCUMENTS

| EP | 2 305 364 A1 | 4/2011 |
| EP | 2 305 964 A1 | 4/2011 |
| JP | 08177409 A * | 7/1996 |

OTHER PUBLICATIONS

International Search Report of PCT/GB2012/050821, dated Jul. 25, 2013.

(Continued)

*Primary Examiner* — Audrey K Bradley
*Assistant Examiner* — Shafiq Mian
(74) *Attorney, Agent, or Firm* — Sughrue Mion, PLLC (57) ABSTRACT

Provided is a steam turbine system including: at least one high pressure turbine, and/or at least one intermediate pressure turbine, and at least one first low pressure turbine, mounted on a first rotary shaft that is coupled to drive at least one first electrical generator; and at least one further low pressure turbine, mounted on a further rotary shaft that is coupled to drive at least one further electrical generator; and the turbine system further including a steam supply system to supply low pressure steam to the low pressure turbines provided with a steam outlet to enable extraction of auxiliary process steam from a location in the steam supply system upstream of the further low pressure turbine but not upstream of the first low pressure turbine.

16 Claims, 4 Drawing Sheets

(51) Int. Cl.
*F01K 7/16* (2006.01)
*F01K 17/04* (2006.01)
*F01K 19/00* (2006.01)

(56) References Cited

U.S. PATENT DOCUMENTS

| | | | | |
|---|---|---|---|---|
| 4,873,827 A * | 10/1989 | Hadano | ...................... | F01K 7/22 60/646 |
| 6,572,328 B2 * | 6/2003 | Tremmel | ................ | F01D 1/023 415/1 |
| 8,525,362 B2 * | 9/2013 | Herzog | .................. | F01D 1/023 290/52 |
| 2008/0104938 A1 | 5/2008 | Finkenrath et al. | | |
| 2009/0136337 A1 * | 5/2009 | Boss | ....................... | F01K 7/165 415/145 |
| 2010/0038917 A1 * | 2/2010 | DiAntonio | ................ | F01K 7/22 290/4 C |
| 2011/0100008 A1 * | 5/2011 | Beul | ....................... | F01K 7/025 60/645 |
| 2011/0120130 A1 * | 5/2011 | Mishima | ................... | F01K 7/16 60/660 |
| 2012/0167568 A1 | 7/2012 | Graeber et al. | | |
| 2012/0255173 A1 * | 10/2012 | Grumann | ................ | F01D 13/02 29/888.021 |
| 2013/0205781 A1 * | 8/2013 | Majumdar | .............. | F01K 17/04 60/648 |

OTHER PUBLICATIONS

International Preliminary Report on Patentability dated Oct. 15, 2013 issued in corresponding PCT Application No. PCT/GB2012/050821.

* cited by examiner

TURBINE SYSTEM

CROSS-REFERENCE TO RELATED APPLICATIONS

This application is a National Stage of International Application No. PCT/GB2012/050821, filed on Apr. 13, 2012, and claims priority from British Patent Application No. 1106410.2 filed on Apr. 15, 2011, the contents of all of which are incorporated herein by reference in their entirety.

BACKGROUND

1. Field

The invention relates a turbine system for a steam turbine power plant and in particular a coal fired steam turbine power plant operating together with a post combustion carbon capture plant. The invention in particular relates to an arrangement for the optimisation of turbine train configuration to facilitate integration with a post combustion carbon capture system.

2. Description of the Related Art

Figure 1:
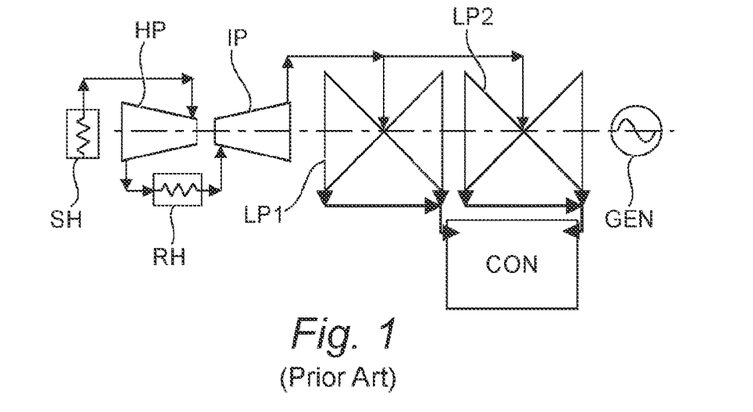
FIG. 1 is a general schematic of a prior art tandem compound arrangement of turbine train.

A typical turbine train for power generation in coal fired plants comprises a high pressure turbine, an intermediate pressure turbine, one or more low pressure turbines and an electrical generator. A typical general configuration of the turbine train for power generation in coal fired plants comprises a high pressure turbine, an intermediate pressure turbine, one or more low pressure turbines and an electrical generator (with excitation system) with rigid couplings connecting the rotors of individual modules which rest on bearing supports in the "tandem compound" arrangement, which is illustrated in FIG. 1. This is familiar to practitioners as prior art.

Other arrangements of turbine train for power generation are generally known.

Figure 2:
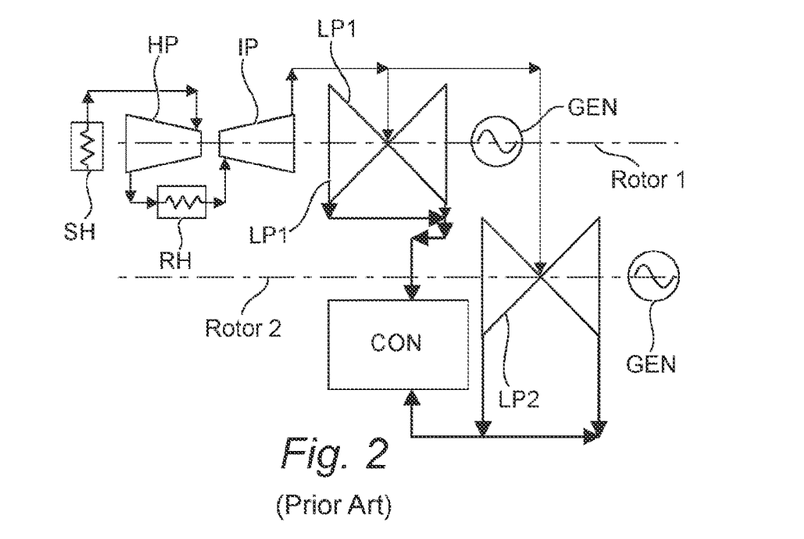
FIG. 2 is a general schematic of a prior art cross compound arrangement of turbine train.

For example in the case of power generation in nuclear plants and/or steam generation plants with large requirements of generation capacity, an alternate turbine train is conceptualised as a "cross compound" arrangement where steam is drawn from a source upstream of the low pressure turbine(s) and distributed to multiple low pressure turbines not all of which are connected to the same rotor train. This ensures rotor-dynamic stability, reduces loss in efficiency due to excessive thermal expansion between sealing fins on account of last stage blade length limitations in available families of low pressure turbines to handle the required flows, and reduces the multiplicity of such turbines mounted on the same shaft. The low pressure turbine on the different shaft is rigidly connected to an electrical generator on the different shaft, but which is a part of the same rotor train. This is illustrated in FIG. 2 and is also familiar to practitioners as prior art.

Figure 3:
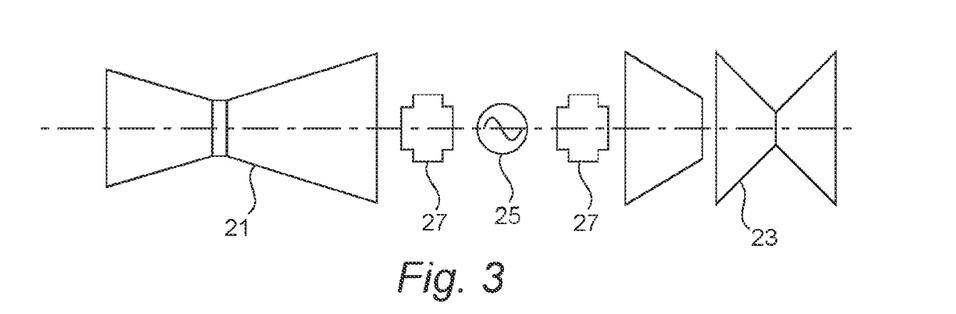
FIG. 3 is a general schematic of a prior art coupled gas turbine/steam turbine arrangement.

Power generation from gas turbines in combined cycle mode of operation often involves a (single shaft) turbine train comprising of a gas turbine (with compressor), electrical generator and steam turbine modules connected with flexible couplings, as typically illustrated in FIG. 3 and is also familiar to practitioners as prior art.

The above arrangement is vital for the operation of the gas turbine in "open cycle" mode, without the steam turbine being necessarily put into operation as in the "combined cycle" mode. This arrangement allows for the economic usage of a single electric generator for a wide range of loads; besides providing wide-ranging flexibilities in operations, testing, erection and commissioning.

The steam turbine modules depicted in FIG. 3 may be replaced by another gas turbine drive for use as a pure "peaking" plant. This provides all the advantages mentioned above in terms of economy and flexibility.

Most of the energy used in the world today is derived from the combustion of fossil fuels, such as coal, oil, and natural gas. Post-combustion carbon capture (PCC) is a means of mitigating the effects of fossil fuel combustion emissions by capturing $CO_2$ from large sources of emission such as thermal power plants which use fossil fuel combustion as the power source. The $CO_2$ is not vented to atmosphere but is removed from flue gases by a suitable absorber and stored away from the atmosphere.

It is known that $CO_2$ can be separated from a gas phase, for example being the flue gas of a thermal power plant, by means of absorption by suitable absorption medium, for example absorbent in liquid phase, typically in aqueous solution. Gas is passed through the absorption medium under conditions of pressure and temperature optimised for removal of substantially all the carbon dioxide. The purified gas is then directed for further processing as necessary. The absorption medium rich in $CO_2$ is subjected to a stripping process to remove the $CO_2$ and regenerate the absorption medium.

Typically this process involves regenerative heating of the medium. The $CO_2$ rich medium is maintained at high temperature, which may be at or near boiling point of an absorbent liquid phase under pressure. The heat necessary is typically obtained when the system is used in association with a thermal power plant by supplying steam from the LP turbine system. At higher temperatures the medium will release the absorbed $CO_2$. Regenerated medium may be drawn off for reuse. The released $CO_2$ may then be collected for example for sequestration. The condensate product of the steam used to supply regenerative heat is returned to the steam generation system.

In case of a tandem compound steam turbine plant such as illustrated in FIG. 1, with integrated post combustion carbon capture, it is necessary to extract steam for the regeneration of the lean solvent from a point upstream of the low pressure steam turbines, for example, in the case where the system comprises HP, IP and LP turbines or turbine sets with combined HP/IP modules, from the vicinity of the IP/LP crossover.

The diverting of steam away from the LP turbine for carbon capture results in a deviation from the design practice embodied in low pressure steam turbines in conventional power stations where this requirement to divert steam for carbon capture is not present.

The pressure upstream of low pressure steam turbines is dictated by a characteristic area available for flow inside the turbine (the "swallowing capacity") and the prevailing condenser vacuum which is dictated by prevalent ambient conditions. Any reduction in flow through low pressure steam turbines results in a reduction of upstream pressure. This reduction in upstream pressure adversely effects the loading of last stages of blades in the intermediate pressure turbine which are typically located upstream of the low pressure steam turbine in the same rotor train, connected with rigid couplings.

The resulting differential between the downstream pressure of the intermediate pressure steam turbine and the upstream pressure of the low pressure steam turbine as a consequence of flow extraction for carbon capture is implemented in the form of a flow restricting device which might for example be a valve in the cross-over line between the intermediate pressure and low pressure steam turbines or a diaphragm valve located within the low pressure steam turbine upstream of the flow passage for the blades.

The consequence of steam extraction from the cross-over line results in a deviation from the optimum design of the low pressure steam turbines for conventional power stations without carbon capture. Both operating efficiency and flexibility are adversely affected, as explained in FIG. 4. Earlier efforts to partially counteract the same and to provide an improved stability of operating regime for a tandem compound steam turbine integrated with a post combustion carbon capture plant have been elaborated in United Kingdom Patent Application No. 1010760.5, entitled "Operation of Steam Turbine and Steam Generator Apparatus with PCC".

Notwithstanding such modifications the integration of a tandem compound steam turbine system with a post combustion carbon capture plant has detrimental ramifications for steam turbine driven plants in terms of capital costs and operating expenditure.

For a steam turbine driven power plant with integrated carbon capture, there is a projected reduction of about 20% from the available power generation capacity due to steam extraction upstream of the low pressure steam turbines. This not only results in oversizing of the low pressure steam turbines and the electrical generator (resulting in increased capital costs), but also results in considerable deterioration of operating efficiency and flexibility of low pressure steam turbines (the extent of such deterioration being lower for the electrical generator).

The oversizing of the low pressure turbines and generator may require the consequent oversizing of a significant number of other capital intensive equipment like turbine foundation, low pressure feed water heaters, condenser, circulating water system, cooling towers, electrical protection system, isolated phase bus ducts, etc. This not only results in significant capital expenditure on oversized components which are expected to perform well below their design duties; but in operating them considerably away from their optimum design level, significantly increase the actual operating expenditure of the power plant.

It is evident from the above that there exist certain specific requirements for integrating a post combustion carbon capture plant with a steam turbine train which cannot be optimally satisfied with a tandem compound configuration. The consequences of non-optimal design lead to greater degrees of deviation in case of carbon capture involving multiple units of steam turbine driven power plants.

Figure 7:
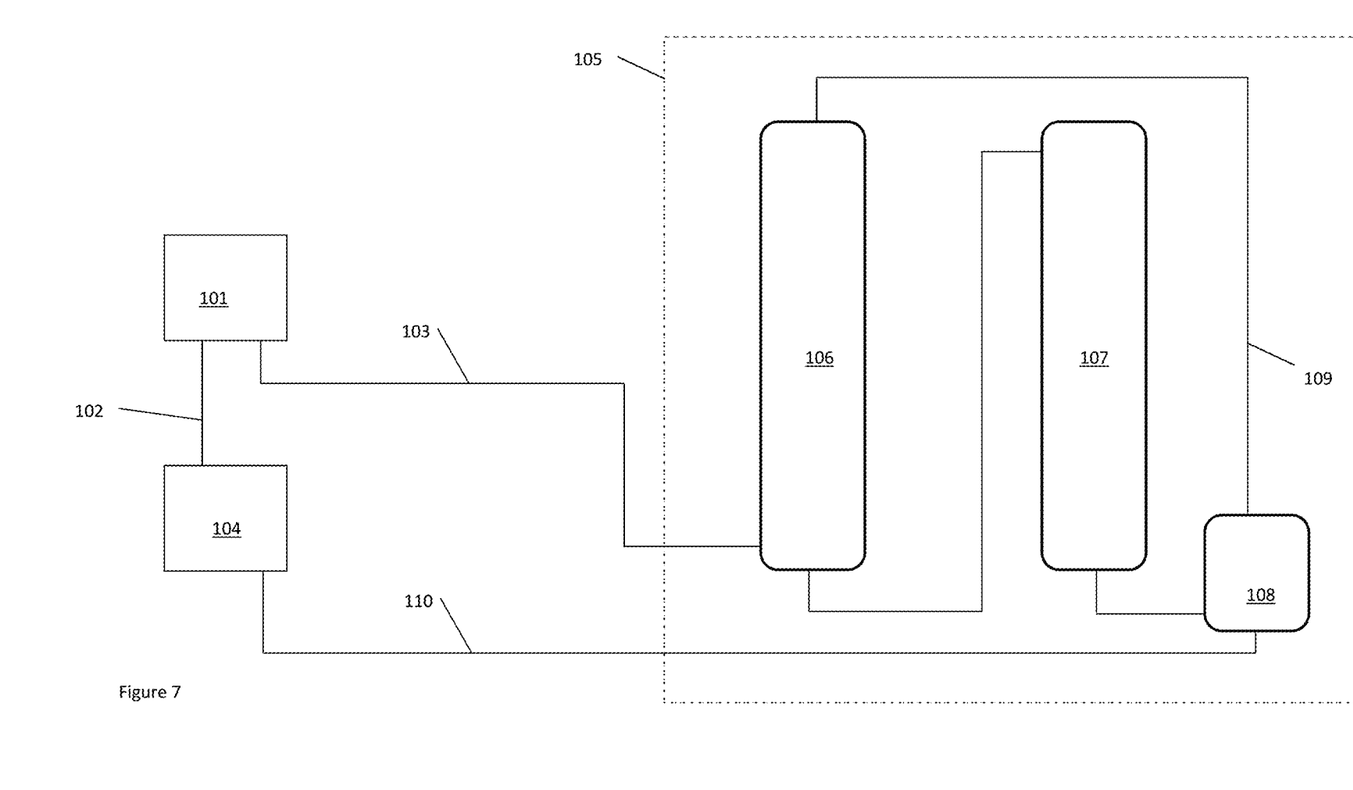
FIG. 7 is a schematic of a typical post combustion carbon capture plant.

For example European Patent Publication EP2333255 describes a fossil fuel combustion thermal power system with carbon capture plant. FIG. 7 illustrates such a typical post combustion carbon capture plant. However the reference concerns itself with part-load operation and protection of the main thermal power system with respect to malfunctioning or trip scenarios of the carbon capture plant. It does not address more fundamental issues like design efficiency with respect to the uncoupling of the flows of the low pressure turbine specifically for flows diverted to the carbon capture plant.

Problems include:
1. Ensuring optimal selection of low pressure steam turbines for both regimes of operation (with or without carbon capture) simultaneously achieving best efficiency with wide operational flexibility.
2. Avoiding oversizing of low pressure steam turbines for multiple regimes of operation (with or without carbon capture) with resultant increase of capital costs and with predicted underperformance.
3. Optimising the selection of low pressure turbines for various percentages of carbon capture in relation to specified/target capacities.
4. Avoiding oversizing of capital intensive equipment typically described above together with the electrical generator and associated systems in view of major reductions in load dispatch (which could exceed 20%).

SUMMARY

In accordance with the invention in a first aspect there is provided a steam turbine system comprising: at least one high pressure turbine, and/or at least one intermediate pressure turbine, and at least one first low pressure turbine, mounted on a first rotary shaft that is coupled to drive at least one first electrical generator; and at least one further low pressure turbine, mounted on a further rotary shaft that is coupled to drive at least one further electrical generator; and further comprising a steam supply system to supply low pressure steam to the low pressure turbines provided with a steam outlet to enable extraction of auxiliary process steam from a location in the steam supply system upstream of the further low pressure turbine but not upstream of the first low pressure turbine.

The arrangement of the HP/IP sets, for example comprising HP and IP turbines or turbine sets with combined HP/IP modules, and other elements of the system will be familiar to those skilled in the art and the invention is not specific to any such arrangement. Single or plural HP and/or IP turbines may be provided fluidly in series and mounted in tandem on a common rotary shaft that is coupled to drive at least one first electrical generator. In the preferred case the steam turbine system comprises fluidly in series an HP turbine set comprising at least one high pressure turbine, an IP turbine set comprising at least one intermediate pressure turbine, and an LP turbine set comprising at least one first and at least one further low pressure turbine. The LP set has a cross compound arrangement with at least one LP turbine also mounted in tandem with the HP and/or IP turbines on the common shaft and at least one other LP turbine. The arrangement is distinguished, for example when compared against EP2333255, by the way in which the cross-compound arrangement may be optimised with the coupling of low pressure turbines of multiple units being located on the same rotor train and connected to the same generator.

Variable/flexible couplings such as clutch couplings may be used to allow differential operation of coupled cross-compound mounted LP turbines. Variable/flexible couplings are provided between each of the first and further LP turbines and their respective generators to allow differential operation of the LP turbines. Such couplings provide a further notable distinction over prior art arrangements such as those in EP2333255.

Steam outlet(s) are located to enable extraction of auxiliary process steam from a location between at least one further low pressure turbine and a higher pressure turbine system upstream thereof and for example from a location between the low pressure turbine system and an intermediate pressure turbine system. Steam is diverted from a point in the LP steam supply system that is upstream of the LP turbine(s) mounted on the further shaft but is not upstream of the LP turbine(s) mounted on the first shaft. For example the LP steam supply system may comprise a common receiving conduit to receive steam from the HP/IP system and parallel delivery conduits to deliver steam separately to each LP turbine, and a steam outlet to provide such a diversion path may be provided in the or each delivery conduit associated with an LP turbine mounted on the further shaft.

The provision of outlets in this way enables extraction of auxiliary process steam from a location in the steam supply system that is upstream of the LP turbine(s) mounted on the further shaft but is not upstream of the LP turbine(s) mounted on the first shaft. Auxiliary process steam may be taken preferentially from the supply to the LP turbine(s) mounted on the further shaft. LP steam supply to the LP turbine(s) mounted on the first shaft may be kept more optimal. In the preferred case auxiliary process steam may be taken solely from the supply to the LP turbine(s) mounted on the further shaft. In the preferred case steam outlet(s) are provided in stream with the part of the steam supply system that supplies the at least one further low pressure turbine but not in stream with the part of the steam supply system that supplies the at least one first low pressure turbine.

Process steam is drawn off to supply additional process module(s) with a source of motive power and/or latent heat. The steam turbine system conveniently further comprises a fluid conduit fluidly continuous with the steam outlet(s) to convey auxiliary process steam to such additional process module(s).

The steam turbine system in the particular preferred case comprises a generator for generation of steam from combustion of carbonaceous fuel, for example coal, for example in a thermal power plant, and is preferably adapted for use with an associated means for post-combustion carbon capture.

In this preferred case, process steam is drawn off to supply an associated post combustion carbon capture plant with a source of motive power and/or latent heat. The steam turbine system conveniently further comprises a fluid conduit fluidly continuous with the steam outlet(s) to convey auxiliary process steam to an associated post combustion carbon capture plant.

While cross-compound turbines have been utilised in the prior art for other purposes, the cross-compound solution offers particular benefits in conjunction with the drawing off of auxiliary process steam, in particular for use in carbon capture. This arrangement does away with the need to design equipment for power plants implementing carbon capture with significant oversizing, while simultaneously ensuring that capital intensive equipment are employed closer to their best efficiency points of operation—significantly reducing operating expenditure.

In a more complete aspect of the invention, it follows that a steam generator system with post-combustion carbon capture capability comprises: a steam generator adapted in use to produce steam in use using thermal energy from combustion of carbonaceous fuel; at least one high pressure turbine, and/or at least one intermediate pressure turbine, and at least one first low pressure turbine, mounted on a first rotary shaft that is coupled to drive at least one first electrical generator; and at least one further low pressure turbine, mounted on a further rotary shaft that is coupled to drive at least one further electrical generator; a steam supply system to supply low pressure steam to the low pressure turbines provided with a steam outlet to enable extraction of auxiliary process steam from a location in the steam supply system upstream of the further low pressure turbine but not upstream of the first low pressure turbine; a post-combustion carbon capture apparatus fluidly disposed to recover $CO_2$ from combustion gases generated by the combustion of carbonaceous fuel in use; a fluid conduit fluidly continuous with the steam outlet to convey auxiliary process steam to the post-combustion carbon capture apparatus.

Thus, in the more complete aspect of the invention, the steam generator system with post-combustion carbon capture capability conveniently comprises a steam turbine system in accordance with the first aspect of the invention in combination with a steam generator adapted in use to produce steam in use using thermal energy from combustion of carbonaceous fuel, a post-combustion carbon capture apparatus fluidly disposed to recover $CO_2$ from combustion gases generated by the combustion of carbonaceous fuel in use, and a fluid conduit fluidly continuous with the steam outlet means of the steam turbine system to convey auxiliary process steam to the post-combustion carbon capture apparatus.

Process steam is drawn off to supply the associated post combustion carbon capture plant with a source of motive power and/or latent heat. In particular, process steam is drawn off to regenerate lean absorbent in a post-combustion carbon capture apparatus using absorbent medium such as absorbent solution, for example to supply latent heat to a re-boiler for lean solvent regeneration. Other supplies of auxiliary process steam may be made available for example to the steam turbine auxiliary drive, and to the reclaimer for maintaining solver properties.

The person skilled in the art will be familiar with suitable power plant and PCC systems. The invention is not particularly limited to any such system.

The post-combustion carbon capture plant may for example comprise an absorber where $CO_2$ is separated from the flue gas by means of absorption/adsorption onto or into a capture medium by passing the gas through a volume containing the capture medium. The capture medium may then be regenerated and the $CO_2$ released for sequestration by regenerative heating. Conveniently, auxiliary process steam from the steam outlet(s) is used to supply latent thermal energy for the regeneration process.

The capture medium may be liquid phase, solid phase, or a combination.

The post-combustion carbon capture plant may for example comprise an absorber column where $CO_2$ is separated from the flue gas by means of absorption by passing the gas through a column where the gas flows in an opposite direction to an absorbent in liquid phase, typically in aqueous solution.

The post-combustion carbon capture plant may for example further comprise a regeneration column where $CO_2$ is removed from capture medium by regenerative heating, for example to at or near boiling point of an absorbent liquid phase under pressure. A suitable heating means is for example a condenser reboiler as is familiar. Again, as is familiar, this condenser reboiler may be disposed to receive solution that has passed through a process volume, for example via an outlet towards the bottom of a column, and reboil the solution to regenerate lean absorbent. Conveniently, auxiliary process steam from the steam outlet(s) is used to supply latent thermal energy for the above processes.

The advantages of the invention accrue when the cross-compound arrangement is used for a turbine train even for single units. However, in the preferred case, the invention may be applied to a steam generator system having multiple units in a single generator plant, and for example to supply a single common carbon capture system.

In this case the invention comprises a multiple unit steam turbine system having a plurality of steam turbine units each comprising a system in accordance with the first aspect of the invention, that is comprising: at least one high pressure turbine, and/or at least one intermediate pressure turbine, and at least one first low pressure turbine, mounted on a first rotary shaft that is coupled to drive at least one first electrical generator; and at least one further low pressure turbine, mounted on a further rotary shaft that is coupled to drive at least one further electrical generator; and further comprising a steam supply system to supply low pressure steam to the low pressure turbines provided with a steam outlet to enable extraction of auxiliary process steam from a location in the steam supply system upstream of the further low pressure turbine but not upstream of the first low pressure turbine.

In a particularly preferred case the further low pressure turbine(s) associated with more than one of the plurality of steam turbine units, and in the most preferred case all the further low pressure turbine(s) associated with the plurality of steam turbine units, may be mounted on a common further rotary shaft that is coupled to drive at least one further electrical generator. Thus, the cross-compound mounted LP turbines from multiple systems are coupled together to drive a common rotary shaft and a common electrical generator.

For example a multiple unit steam turbine system in accordance with such an embodiment may comprise at least a first steam turbine unit having a first and a second low pressure turbine mounted on a first rotary shaft that is coupled to drive a first electrical generator and a further low pressure turbine, and a second steam turbine unit having a first and a second low pressure turbine mounted on a second rotary shaft that is coupled to drive a second electrical generator and a further low pressure turbine, wherein the further low pressure turbine of each steam turbine unit is mounted on a common third rotary shaft that is coupled to drive a third electrical generator. Other preferred features of each such steam turbine unit of the multiple unit embodiment may be understood with reference to the foregoing.

Variable/flexible couplings such as clutch couplings may be used to allow differential operation of coupled cross-compound mounted LP turbines on such a common shaft.

BRIEF DESCRIPTION OF THE DRAWINGS

Reference is made by way of example only to FIGS. 1 to 6 of the accompanying drawings, in which.

DETAILED DESCRIPTION

FIG. 1 illustrates a general schematic of a typical prior art tandem compound arrangement of turbine train in which a high pressure turbine (HP), an intermediate pressure turbine (IP) and a pair of low pressure turbines (LP1, LP2) are coupled and mounted on a single shaft connected to a single generator (GEN). In conventional manner the high pressure turbine (HP) typically draws steam from the super-heating (SH) section of a steam generating boiler, while the intermediate pressure turbine (IP) draws steam from the reheating (RH) section of a steam generating boiler. The LP turbines are fluidly connected to a condenser arrangement (CON) comprising either separate or common condensers.

FIG. 2 illustrates a general schematic of a typical prior art cross compound arrangement of turbine train. Where applicable like references are used. A high pressure turbine (HP), an intermediate pressure turbine (IP) and a first low pressure turbine (LP1) are coupled and mounted on a first shaft (ROTOR1) connected to a generator. A second low pressure turbine (LP2) is coupled and mounted on a second shaft (ROTOR2) connected to a second generator. In conventional manner the high pressure turbine (HP) typically draws steam from the super-heating (SH) section of a steam generating boiler, while the intermediate pressure turbine (IP) draws steam from the reheating (RH) section of a steam generating boiler. The LP turbines are connected to a condenser arrangement (CON) typically comprising separate condensers.

FIG. 3 shows a single shaft gas turbine (21) coupled with steam turbine modules (23) and generator (25) via flexible couplings (27) such as clutch couplings.

Figure 4:
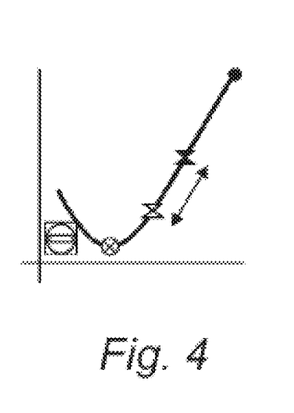
FIG. 4 shows a typical exhaust loss curve for a typical LP turbine operating regime.

FIG. 4 shows the operating regimes of a low pressure steam turbine. The figure shows a plot of exhaust loss against flow through the turbine.

Steam extraction for PCC reduces flow to LP, shifting the point of operation to the left along this ordinate. For LP turbines with longer blade sizes (which is limited by speed), the above curve would shift further to the right, maintaining approximately the same ordinates, but with increasing latus rectum of the parabola.

In principle the highest efficiency point of operation is at the vertex of the curve, but this is practically unsustainable. The area to the left of this point should be considered a forbidden zone of operation because exhaust losses increase rapidly with reducing flow. The graph plots highest and lowest specified cooling water temperatures. The zone of stable operation will lie between. A threshold of operation is plotted at lowest possible cooling water temperature. The output would have to be reduced to retain plant controllability below this temperature.

Figure 5:
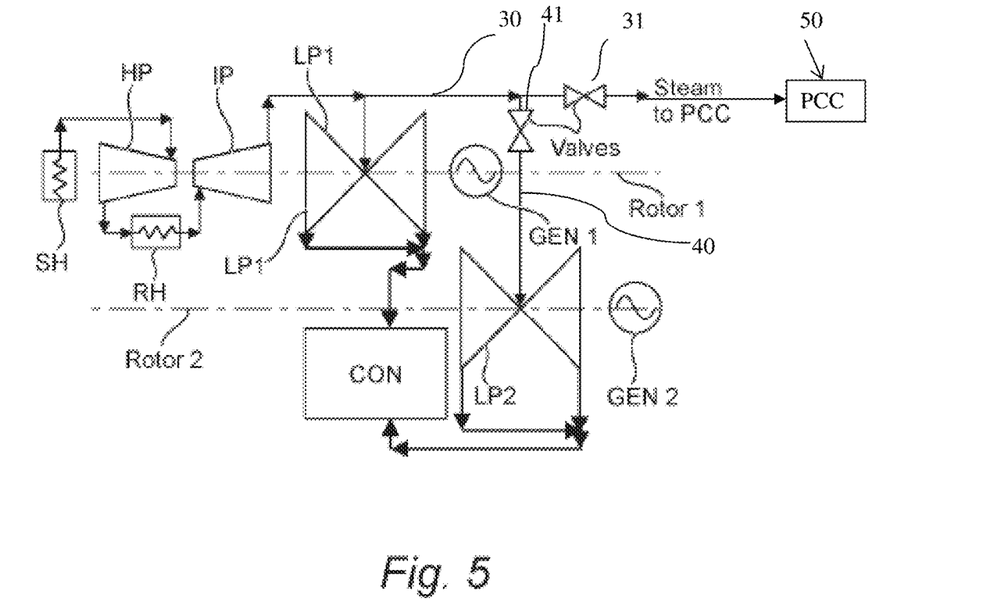
FIG. 5 is a schematic of an embodiment of the invention involving a single unit.
Figure 6:
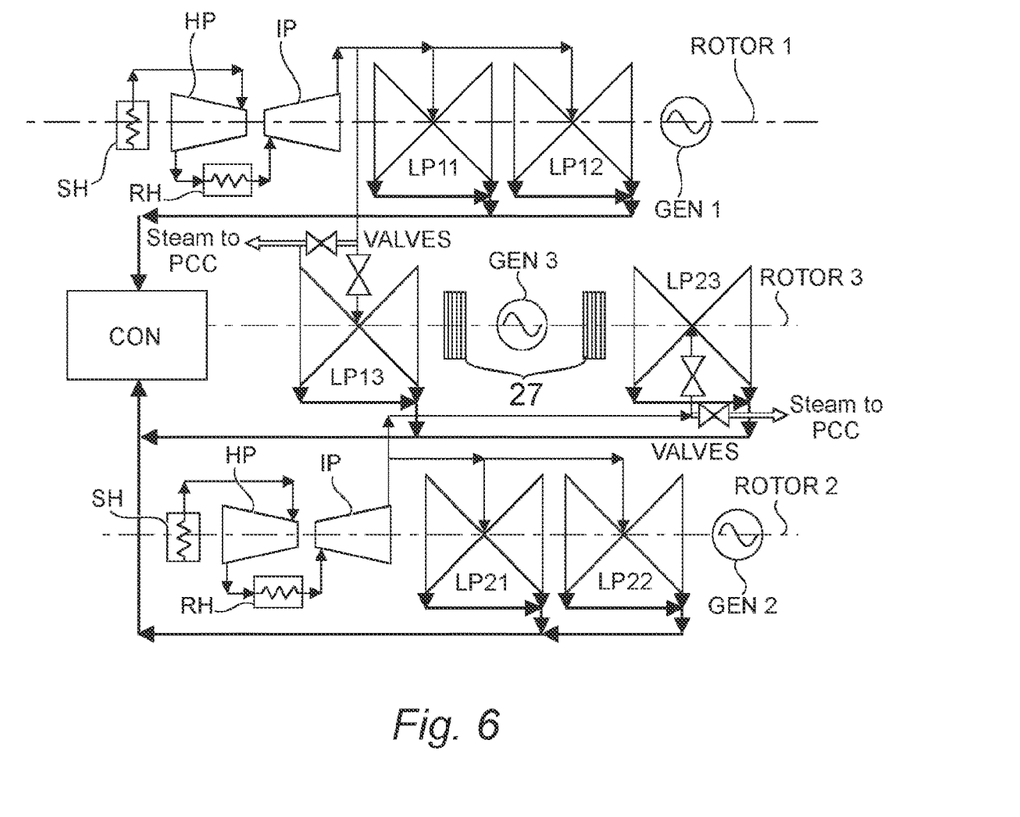
FIG. 6 is a schematic of an embodiment of the invention involving two coupled units.

A brief description of this invention, as it might be implemented in a first example embodiment for a single unit implementing carbon capture (as shown in FIG. 5) and the extension of the concept for two units within a single power plant implementing carbon capture (as shown in FIG. 6) is provided below. An extension of the outlined concept to include more than two units within a single power plant would be readily within the compass of the skilled person and is considered included within the scope of this invention.

The embodiment of FIG. 5 applies the invention to a generator system of a power plant implementing carbon capture made up of a single power unit. It comprises two rotor trains—ROTOR 1 and ROTOR 2.

The first rotor train, ROTOR 1 typically comprises a high pressure turbine (HP), an intermediate pressure turbine (IP), and one or more low pressure turbines (LP1—one shown in the example) and an electric generator (GEN) mounted on bearings and attached with couplings for transmission of power.

The high pressure turbine (HP) typically draws steam from the super-heating (SH) section of a steam generating boiler, while the intermediate pressure turbine (IP) draws steam from the reheating (RH) section of a steam generating boiler. While the present description depicts by way of example a typical arrangement with separate HP, IP and low pressure (LP) turbines with re-heating, the scope of the invention will be understood to include all combinations of turbine modules such as integrated high-pressure/intermediate-pressure (HIP) modules or integrated intermediate-pressure/low-pressure modules with or without reheating.

It will be understood that the invention may include all potential installations of a turbine train as in nuclear power stations (boiling water or pressurised water reactors) with or without reheat and in gas turbine driven power stations with or without reheat. Applications are deemed to include both half-speed and full-speed machines (compared to grid frequency).

In all such cases the steam generating boiler (or heat recovery steam generator) which may be designed with or without reheating sections, or the nuclear reactor is designed to generate the required quantity of steam at the maximum temperature and pressure permitted by equipment design for generating the desired quantity of power.

The principal turbine train is designed in such a way that the necessary steam extraction for the post combustion carbon capture is effected from the IP/LP cross-over line. However, the consequences of steam extraction from any other location upstream of the one depicted above (e.g. steam extractions from the IP turbine, the cold reheat line, etc.) would also be manifest in reducing the quantity of flow in a steam supply conduit 30 through the low pressure turbine(s) in ROTOR 1 compared to a conventional tandem compound steam turbine driven power plant operating without carbon capture, and the consequent problems in such alternative approaches would also be considered to be resolved by adoption of the present invention.

In the embodiment there is provided a further steam supply conduit 40 and a further LP turbine (LP2) not mounted on the same rotor train as the principal turbine train for each unit. This is depicted as ROTOR 2 in FIG. 5.

Steam extracted from the IP/LP crossover is taken from the supply to this LP turbine. The steam flow supplying this LP turbine is routed by means of opening and closing appropriate flow restricting devices (e.g. valves 31, 41) to the carbon capture plant (PCC 50) or alternately routed to the further LP turbine (LP2).

The first and further LP turbines (LP1, LP2) are connected to a condenser arrangement (CON) generally comprising separate condensers.

Using the valves 31, 41 for the extraction of steam to supply the carbon capture plant (PCC 50) reduces the mass flow to the low pressure system compared to the scenario of design without carbon capture.

The implementation shown in FIG. 5 enables the volumetric sizing of the low pressure turbine in ROTOR 1 to be designed for optimum efficiency based on a mass flow with steam being diverted to the post combustion carbon capture process in the PCC 50. This addresses the oversizing problem associated with low pressure turbines in a tandem compound steam turbine train within a power plant implementing the post combustion carbon capture process.

The implementation shown in FIG. 5 enables the volumetric sizing of the low pressure turbine in ROTOR 2 (in the cross-compound arrangement) to be designed for optimum efficiency with respect to the steam flow required for the post combustion carbon capture process. The inlet valve 41 upstream of this turbine would be closed when the post combustion carbon capture (PCC 50) plant is in operation and the steam diverted to the PCC plant is to be used for power generation. This valve 41 would be open when the post combustion carbon capture (PCC 50) plant is not in operation to allow steam to flow through the conduit 40 to the further turbine (LP2).

LP1 and GEN1 may be optimised for steam flow excluding PCC. LP2 and GEN2 may be optimised for steam flow required for PCC when it is not operational.

The adoption of this scheme potentially addresses and mitigates the problem of departure from best efficiency points for low pressure turbines in a tandem compound arrangement towards to the minimum point in the Exhaust Loss vs. Flow characteristic. It simultaneously provides the following benefits:

- Reduced probability of operation to the left of the minimum point.
- Increased range of part load operation enabling carbon capture.
- Enhanced flexibility to increased cooling water temperature in condenser (which results in reduced vacuum, lowering exhaust loss and nudging the operating point to the minimum Exhaust Loss).

The thermodynamic efficiency may be increased for the turbine modules due to reduced clearance necessary between the sealing fins corresponding to reduced length of rotor train compared to traditional tandem compound designs.

The rotor-dynamic stability of each turbine train may be improved corresponding to the reduced length and slenderness ratio compared to traditional tandem compound designs.

Shorter start-up times are possible due to the reduced length of the rotor trains compared to the traditional tandem compound designs. Additional flexibility for start-up is achieved for the cross-compound solution implementing carbon capture compared to tandem compound designs.

The placement of a separate turbine capable of accepting steam from PCC on a separate train may increase the availability of the power plant in case of any malfunctions or trips occurring in the PCC plant. This scenario can be conceptualised in the following ways:

- In case of carbon capture implemented in tandem compound designs, a trip in the PCC would necessitate the provision an adequately designed bypass arrangement to divert steam intended for PCC to the steam dump device (SDD) of the main condenser, considerably increasing the size/cost of the equipment together with the strength of tubes to withstand increased impact and vibrations.
- The controlled re-entry of steam into the low pressure turbines (already operating at synchronous speed) of a tandem compound arrangement in case of a PCC trip would have to be monitored against increased vibration and eccentricity of turbine bearings, which act as trip signals for the entire train. This scenario is to be analysed with respect to the loading of blades, sealing fins, etc.
- A separate turbine mounted on a cross-compound train (with PCC) can accept steam in a sequential manner by the manipulation of the inlet valves. The start-up of the secondary turbine would not influence the operation of the principle turbine train and would be able to provide the maximum flexibility of optimising power generation in case of a PCC trip scenario.
- Any malfunction of the secondary turbine can be provided for a bypass arrangement into the steam dump device of the secondary condenser, without affecting the sizing, costing and operational complexity of the main condenser, catering to the low pressure turbine(s) in ROTOR 1.

The low pressure turbine in ROTOR 2 is coupled to a different Generator, GEN2. The size of each generator, GEN 1 and GEN 2 and the associated auxiliary systems are optimised for power generation with and without carbon capture respectively. Compared to traditional tandem compound designs, this can reduce oversizing.

The embodiment of the cross-compound arrangement for carbon capture reduces the oversizing, costs and departure from best efficiency points of major capital intensive equipment like low pressure heaters, condenser, cooling tower, turbine foundations, etc.

The selection of smaller low pressure turbines in a cross compound design optimised for carbon capture compared to tandem compound designs reduces the height of turbine generator building by reducing the clearance necessary for the main turbine hall crane to move the outer casing of the low pressure turbines above the isolated phase bus connections to the generator.

The splitting of generation capacity into smaller generators located in different trains of the cross compound solution reduces the rotor tube withdrawal length compared to the bigger generator of tandem compound designs. This reduces the overall length of the turbine generator building.

The width of the turbine generator building for the cross compound arrangement can be optimised for the additional lay-down area by proper location of the control room.

Independent start-up/shut-down, overspeed testing, is possible.

The response of the power plant with PCC with regard to load fluctuations and transient/peaking power capability is considerably improved compared to a tandem compound arrangement.

The embodiment of FIG. 6 applies the invention to a generator system of a power plant implementing carbon capture made up of two power units and having two steam turbine trains.

It comprises two main rotor trains identified as ROTOR 1 and ROTOR 2.

Each rotor train (typically) comprises of a high pressure turbine (HP), an intermediate pressure turbine (IP), one or more low pressure turbines (LP11, LP12, LP21, LP22) and an electric generator (GEN1, GEN2) mounted on bearings and attached with couplings for transmission of power.

Further the LP turbines from the two units (LP 13 and LP 23) are mounted on a different rotor train (ROTOR 3) connected to either side of a common electric generator (GEN 3) with flexible couplings (23) for example clutch couplings. Thus GEN3 serves as the generator for the cross compound mounted turbine for each of the two units. This does away with the requirement of having two electric generators for each unit implementing the cross-compound arrangement.

The LP turbines are connected to a condenser arrangement (CON) generally comprising separate condensers.

This provides a unique solution optimised for carbon capture and storage. A third LP (LP13, LP23) of each of the first and second steam turbine trains is coupled to a common generator on a third rotor shaft via a flexible coupling. These third LPs and GEN3 may be optimised for steam flow required for PCC when it is not operational.

The advantages of the cross-compound arrangement for a power plant implementing PCC set out in respect of FIG. 5 apply. Steam supplying the PCC plant can be drawn without influencing the main turbine trains (ROTOR 1 and ROTOR 2).

However the coupling of the cross-compound turbines from multiple units into a single train offers further complementary advantages.

The size of the generator in the turbine train dedicated for carbon capture (ROTOR 3) can be optimally selected for combined generation capacity to only cater for the loss in generation capability as a result of anticipated modes of carbon capture across multiple units within a single power station.

This embodiment permits enhanced flexibility of operation of each unit within a power plant with or without carbon capture and with partial levels of carbon capture.

Independent start-up/shut-down scenarios and sequences are possible for multiple units with and without carbon capture in the most optimum way.

This invention provides for independent fail safe modes of disengaging low pressure turbines for carbon capture corresponding to individual trip scenarios for each unit.

Independent provisions for part load operation and peaking transients for various units of a power plant with or without carbon capture can be optimally incorporated through this invention.

Independent synchronisation is possible for multiple units with or without carbon capture in the most optimal manner.

Independent testing of over-speed, valve-looping, no-load (barring gear) operation is possible for each turbine train with or without carbon capture.

Provision of flexible couplings allows synchronous compensation for the generator in the turbine train dedicated for carbon capture, which maximises revenue earning potential.

For more than two units within a single power plant with integrated carbon capture, additional units can be located on either side of the generator on ROTOR 3 (dedicated to carbon capture). The mounting of additional turbine modules in this rotor train would be dictated by engineering decisions pertaining to layout, coupling strength and rotor-dynamics.

As noted above, FIG. 7 shows a simple schematic of a typical post combustion carbon capture plant such as is illustrated for example in EP2333255, for use in accordance with the invention for example with the turbine system of the previous figures.

Shown schematically, a steam generator 101 is adapted in use to produce steam in use using thermal energy from combustion of carbonaceous fuel and supply steam 102 to a steam turbine system 104. It also produces combustion gases 103 generated by the combustion of carbonaceous fuel including CO2. The combustion gases including CO2 are passed to a PCC apparatus 105. The PCC apparatus has an absorber column 106 where CO2 is separated from the flue gas by means of by passing the gas through a column where the gas flows in an opposite direction to an absorbent solution in liquid phase. The PCC apparatus has a regeneration column 107 where CO2 is removed from absorbent solution by regenerative heating. The PCC apparatus has a condenser reboiler 108 disposed to receive absorbent solution and reboil the solution to regenerate lean absorbent 109. Auxiliary process steam 110 from the steam outlet(s) of the steam turbine system is used to supply latent thermal energy for the above processes.

The invention claimed is:
1. A steam turbine system comprising:
  at least one high pressure turbine, and/or at least one intermediate pressure turbine;
  at least one first low pressure turbine mounted on a first rotary shaft that is coupled to drive at least one first electrical generator;

at least one further low pressure turbine located downstream from die first low pressure turbine, and mounted on a further rotary shaft that is coupled to drive at least one further electrical generator;
steam supply conduits that supply low pressure steam to the first and further low pressure turbines; and
a valve that diverts auxiliary process steam from a location in the conduits upstream of the further low pressure turbine but not upstream of the first low pressure turbine,
wherein the valve configured to divert the auxiliary process steam to a post combustion carbon capture plant when the post combustion carbon capture plant is in operation and to not divert the auxiliary process steam to the post combustion carbon capture plant when the post combustion carbon capture plant is not in operation.

2. The steam turbine system in accordance with claim 1 further comprising fluidly in series: (i) a high pressure turbine set comprising at least one high pressure turbine, (ii) an intermediate pressure turbine set comprising at least one intermediate pressure turbine, and (iii) a low pressure turbine set comprising at least one first and at least one further low pressure turbine.

3. The steam turbine system in accordance with claim 1, wherein the conduits comprise a common receiving conduit to receive steam from the fluidly preceding higher pressure system and parallel delivery conduits to deliver steam separately to the further low pressure turbine.

4. The steam turbine system in accordance with claim 1, wherein variable/flexible couplings are provided between each of the first and further low pressure turbines and their respective generators to allow differential operation of the low pressure turbines.

5. The steam turbine system in accordance with claim 1, further comprising one or more fluid conduits fluidly continuous with the valves to convey auxiliary process steam to additional process module(s) as a source of motive power and/or latent heat.

6. The steam turbine system in accordance with claim 5 further comprising one or more fluid conduits fluidly continuous with the valves to convey auxiliary process steam to the post combustion carbon capture plant.

7. The steam turbine system in accordance with claim 1 further comprising a generator for generation of steam from combustion of carbonaceous fuel, and adapted for use with the post-combustion carbon capture plant.

8. A multiple unit steam turbine system having a plurality of steam turbine systems recited in claim 1.

9. The multiple unit steam turbine system in accordance with claim 8, wherein the or each further low pressure turbine of each steam turbine system is mounted on a common further rotary shaft that is coupled to drive at least one further electrical generator.

10. The multiple unit steam turbine system in accordance with claim 9 comprising at least a first steam turbine system having a first and a second low pressure turbine mounted on a first rotary shaft that is coupled to drive a first electrical generator and a further low pressure turbine, and a second steam turbine system having a first and a second low pressure turbine mounted on a second rotary shaft that is coupled to drive a second electrical generator and a further low pressure turbine, wherein the further low pressure turbine of each steam turbine unit is mounted on a common third rotary shaft that is coupled to drive a third electrical generator.

11. The multiple unit steam turbine system in accordance with claim 9, wherein the further low pressure turbines are mounted via flexible couplings configured to allow differential operation of the further low pressure turbines on a common shaft.

12. A steam generator system with post-combustion carbon capture capability comprising:
a steam generator configured to produce steam using thermal energy from combustion of carbonaceous fuel;
a steam turbine system in accordance with claim 1;
wherein the post-combustion carbon capture apparatus is fluidly disposed to recover CO2 from combustion gases generated by the combustion of carbonaceous fuel when in use;
a fluid conduit fluidly continuous with at least one of the valves of the steam turbine system to convey the auxiliary process steam to the post-combustion carbon capture apparatus.

13. The system in accordance with claim 12, wherein the post-combustion carbon capture apparatus comprises an absorber where CO2 is separated from a flue gas by means of absorption/adsorption onto or into a capture medium by passing the gas through a volume containing the capture medium.

14. The system in accordance with claim 13, wherein the post-combustion carbon capture apparatus comprises an absorber column where CO2 is separated from the flue gas by means of absorption by passing the gas through a column where the gas flows in an opposite direction to an absorbent in liquid phase.

15. The system in accordance with claim 13, wherein the post-combustion carbon capture system further comprises a regeneration column where $CO_2$ is removed from capture medium by regenerative heating.

16. The system in accordance with claim 15 comprising a condenser reboiler disposed to receive absorbent solution and reboil the solution to regenerate lean absorbent.

* * * * *

UNITED STATES PATENT AND TRADEMARK OFFICE
CERTIFICATE OF CORRECTION

PATENT NO. : 9,631,520 B2  
APPLICATION NO. : 14/112003  
DATED : April 25, 2017  
INVENTOR(S) : Pramurtta Shourjya Majumdar Page 1 of 1

It is certified that error appears in the above-identified patent and that said Letters Patent is hereby corrected as shown below:

In the Claims

Column 13, Line 2: delete "die" and insert --the--

Column 13, Line 51: delete "or each"

Signed and Sealed this  
Fifteenth Day of August, 2017

Joseph Matal  
*Performing the Functions and Duties of the*  
*Under Secretary of Commerce for Intellectual Property and*  
*Director of the United States Patent and Trademark Office*